(12) United States Patent
Valcarce et al.

(10) Patent No.: US 6,534,100 B1
(45) Date of Patent: Mar. 18, 2003

(54) METHODS FOR TREATING CHOLESTEROL-CONTAINING FOODSTUFFS USING LIVE CILIATES

(76) Inventors: German A. Valcarce, Bustamante 2434, 5B, RA-1425 Buenos Aires (AR); Alejo Itzkovici, Bustamante 2434, 5B, RA-1425 Buenos Aires (AR); Joseph B. Harris, 330 SE. Camino St., Pullman, WA (US) 99163; Jorge Florin-Christensen, 1430 NE. Upper Dr., Pullman, WA (US) 99163

( * ) Notice: Subject to any disclaimer, the term of this patent is extended or adjusted under 35 U.S.C. 154(b) by 0 days.

(21) Appl. No.: 09/641,609

(22) Filed: Aug. 17, 2000

Related U.S. Application Data

(60) Provisional application No. 60/153,754, filed on Sep. 13, 1999, provisional application No. 60/153,741, filed on Sep. 13, 1999, provisional application No. 60/172,844, filed on Dec. 20, 1999, and provisional application No. 60/177,252, filed on Jan. 20, 2000.

(51) Int. Cl.[7] ............... A23L 1/303; A23L 1/32; A23C 9/12
(52) U.S. Cl. ............... 426/42; 426/47; 426/56
(58) Field of Search ............... 435/258.1, 947; 426/42, 47, 32, 56, 61, 580, 614

(56) References Cited

U.S. PATENT DOCUMENTS

| | | |
|---|---|---|
| 4,921,710 A | 5/1990 | Beitz et al. |
| 5,436,004 A | 7/1995 | Beitz |
| 5,503,988 A | 4/1996 | Saito et al. |
| 5,750,164 A | 5/1998 | Saito et al. |
| 5,856,156 A | 1/1999 | Ambrosius et al. |
| 5,876,993 A | 3/1999 | Saito et al. |

FOREIGN PATENT DOCUMENTS

| | | |
|---|---|---|
| EP | 0 278 794 A1 | 8/1988 |
| EP | 0 816 489 A1 | 1/1998 |
| FR | 2 574 089 A | 6/1986 |

OTHER PUBLICATIONS

Isaev, et al. "Determination of the Biological Value of Milk . . . ", *Veterinariya*, (USSR), No. 11, p. 85–86, Nov. 1975.*

Harmayani, E. et al., "Isolation and screening of microorganisms for their ability to reduce the amount of cholesterol in a model system." *Database FSTA Online!, International Food Information Service*, XP002155283, Abstract in 1 pg., Jan. 1999.

Aihara, H., "Degradation of Cholesterol in Egg Yolk by Rhodococcus equi N°23, " *Journal of Food Science*, 53(2):659–660, Feb. 1988.

Elliott, A.M., Biology of Tetrahymena, Dowden, Hutchinson & Ross, Inc., Stroudsburg, Pennsylvania, pp. 103–112, No date available.

Nes, W.R. et al., "Steric effects at C–20 and C–24 on the metabolism of sterols by *Tetrahymena pyriformis*," *Journal of Lipid Research*, 22:770–777, May 1981.

Conner R.L. et al., "The Conversion of Cholesterol to $\Delta^{5,7,22}$–Cholestatrien–3β–ol by *Tetrahymena pyriformis*," *The Journal of Biological Chemistry*, 244(9–12):2325–2333, May 1969.

Connor R.L. et al., "The Steric Requirements for Sterol Inhibition of Tetrahymanol Biosynthesis," *Lipids*, 13(10):692–696, Oct. 1978.

Ferguson, K.A. et al., "Effect of Sterol Replacement In Vivo on the Fatty Acid Composition of *Tetrahymena*," *The Journal of Biological Chemistry*, 250(17):6998–7005, Sep. 1975.

Mallory, F.B. et al., "Dehydration and Dealkylation of Various Sterols by *Tetrahymena pyriformis*," *Lipids*, 6(3):149–153, Mar. 1971.

* cited by examiner

*Primary Examiner*—Keith Hendricks
(74) *Attorney, Agent, or Firm*—Christensen O'Connor Johnson Kindness PLLC

(57) ABSTRACT

The present invention provides methods for changing the composition of a cholesterol-containing foodstuff. The methods comprise the step of culturing a member of the family Tetrahymenidae in a liquid, cholesterol-containing foodstuff under conditions that enable one or more (or all) of the following changes in the composition of the foodstuff: (a) reduction in the level of cholesterol in the treated foodstuff; (b) reduction in the level of saturated fatty acids in the treated foodstuff; (c) increase in the level of unsaturated fatty acids in the treated foodstuff; (d) increase in the level of at least one vitamin D precursor in the treated foodstuff and (e) reduction in the level of at least one protein in the treated foodstuff. The foodstuff can be a dairy product, such as milk or egg yolk.

33 Claims, 5 Drawing Sheets

METHODS FOR TREATING CHOLESTEROL-CONTAINING FOODSTUFFS USING LIVE CILIATES

RELATED APPLICATIONS

This application claims benefit of priority from U.S. Provisional Patent Application No. 60/153,754, filed Sep. 13, 1999, U.S. Provisional Patent Application No. 60/153,741, filed Sep. 13, 1999, U.S. Provisional Patent Application No. 60/172,844, filed Dec. 20, 1999, and U.S. Provisional Patent Application No. 60/177,252, filed Jan. 20, 2000, under 35 U.S.C. §119.

FIELD OF THE INVENTION

This application relates to the treatment of foodstuffs using live cultures of protozoa, such as *Tetrahymena thermophila*. One aspect of the present invention is the provision of methods for the conversion of cholesterol present in foodstuffs into provitamin D3 and other sterols containing a double bond at position 7.

BACKGROUND OF THE INVENTION

Animal milk is a complex mixture of different compounds, including lipids, proteins, minerals, sugars and vitamins (Russof, L. L. (1970), J. Dairy Science 53:1296–1302). The calcium, phosphate and vitamin D content of milk make it an adequate source of nutrients for bone formation (Fox, P. F. and McSweeney, P. L. H. (1998a) Salts of milk. In "Dairy Chemistry and Biochemistry", chapter 5, Blackie Academic & Professional, London). This may be a key aspect of its role in nature, allowing mammalian newborns to complete the formation of the skeleton after birth. Mineral and vitamin components of milk are also important to preserve bone structure in adulthood. Milk is also relatively economical, compared to other animal protein sources, and thus it makes a valuable contribution to the human diet (Russof, L. L. (1970), J. Dairy Science 53:1296–1302).

The lipid fraction of milk includes cholesterol, however, which has been implicated as a causative agent of coronary artery disease (Artaud-Wild, S. M., Connor, S. L., Sexton, G., Connor, W. E. (1993), Circulation 88:2771–2779). Other foodstuffs of animal origin such as eggs, which are commonly used in the preparation of a variety of food products, present the same problem. Because of the special organoleptic traits of milk and eggs, it is difficult to replace them by other products with less cholesterol content.

Patients with coronary heart disease (CHD) or hypercholesterolemia are commonly recommended to decrease their dietary cholesterol intake. Moreover, the general awareness of the risks associated with high blood cholesterol levels is an important factor limiting the consumption of eggs and dairy products by a health-conscious public. Cholesterol content is frequently indicated in the nutrition facts labels printed on food packages.

To address these problems, there is a need for methods to produce low-cholesterol versions of normally high-cholesterol foodstuffs, such as whole milk and eggs. Such methods should preferably not appreciably change the physical and organoleptic properties of the foodstuffs. The nutritional value of the treated foodstuffs should be preferably maintained, especially the levels of those components that are lipid-soluble and that are important for human nutrition (e.g., vitamins A and D, and essential fatty acids). Thus, the food treatment methods should yield products with lower cholesterol content but which are otherwise similar to the untreated foodstuffs. Additionally, the novel methods should preferably not require expensive equipment and materials or potentially toxic materials, such as organic solvents.

A number of methods have been described in patents in the US and other countries for reducing the cholesterol content of foodstuffs. For example, cholesterol can be removed from foodstuffs by the use of physicochemical methods. For instance, the use of supercritical fluids to produce liquid egg having reduced cholesterol content has been proposed (Ogasahara et al., U.S. Pat. No. 5,116,628). However, the high temperatures and pressures needed for the process can denature proteins present in the foodstuffs. Likewise, the production of low cholesterol butter oil by vapor sparging (Conte et al., U.S. Pat. No. 5,092,964) is another example of a method which, due to the extreme conditions used, is likely to denature proteins and alter organoleptic properties of the foodstuffs.

The use of organic solvents to extract cholesterol from foodstuffs has also been proposed. Thus, Fallis et al. (U.S. Pat. No. 4,104,286) have proposed the use of aqueous ethanol saponification and extraction with hydrocarbons and methanol to obtain free cholesterol, saponified fats and edible egg powder. This process uses extreme conditions and large quantities of organic solvents which may contaminate the processed foodstuffs. Extraction with liquid dimethylether (Yano et al., U.S. Pat. No. 4,234,619) is similarly inconvenient and does not appear to be selective for cholesterol as other neutral lipids are removed from the foodstuff. Johnson et al. (U.S. Pat. No. 4,997,668) applied solvent extraction to milk, but again the method does not appear to be selective for cholesterol and utilizes organic solvents which may contaminate foodstuffs.

A variation on the use of organic solvents is to employ oils to extract cholesterol from either aqueous or dry foodstuffs, like egg yolk and dairy products. (Bracco et al., U.S. Pat. No. 4,333,959; Keen, U.S. Pat. No. 5,039,541; Conte et al., U.S. Pat. No. 5,091,203; Merchant et al., U.S. Pat. No. 5,378,487; Jackeschky, U.S. Pat. No. 5,780,095). Again, these methods do not selectively extract cholesterol and oils contaminated with cholesterol are inevitably produced, which is undesirable.

Removal of cholesterol by formation of complexes with cyclodextrins has also been proposed for fatty substances of animal origin (Courregelongue et al., U.S. Pat. No. 4,880,573) and specifically in the case of dairy products (Chung Dae-Won, WO 9917620). The formation of complexes of cholesterol and saponin has also been described as a means to reduce cholesterol in milk (Richardson, U.S. Pat. No. 5,326,579). These methods are, however, too expensive for industrial applications.

A different approach is based on the use of enzymes that modify cholesterol. Thus, the use of cholesterol reductases, that modify cholesterol into poorly absorbed sterols, has been proposed (Beitz et al., U.S. Pat. No. 4,921,710; Ambrosius et al., U.S. Pat. No. 5,856,156). Another proposed enzymatic approach is the conversion of cholesterol into epicholesterol, which is then further modified by an epicholesterol dehydrogenase (Saito et al., U.S. Pat. No. 5,876,993). These methods are likely too expensive for industrial use, due to the cost of reasonably pure enzyme preparations, and they do not result in the conversion of cholesterol into useful compounds for human nutrition.

There is therefore a need for methods for treating foodstuffs to reduce the amount of cholesterol. Preferably, the cholesterol is converted to one or more substances that are useful for human nutrition, vitamin D, or a precursor of vitamin D such as the substances shown in FIG. 1. For example, as shown in FIG. 2, desaturation of cholesterol at position 7 converts it into provitamin D3, which upon UV irradiation in the skin can be activated to vitamin D3.

Additionally, there is a need for methods to increase the level of essential unsaturated fatty acids in milk. For example, gamma-linolenic acid (18:3, n-6) is a precursor of arachidonic acid, a second messenger molecule, which in turn is the source of many other important physiological compounds, like prostaglandins. The polyunsaturated fatty acid content of milk is relatively small compared to other fatty acids. Increasing the amount of n-6 unsaturated fatty acids in milk is desirable, because such modified milk can be a sufficient source of this type of essential fatty acid. Differences in coronary mortality can be explained by differences in cholesterol and saturated fat intakes in 40 countries but not in France and Finland (See, Artaud-Wild, S. M. et al., Circulation 88:2771–2779). Moreover, an enhanced level of this type of unsaturated fatty acid promotes cardiovascular health.

Most species of protozoa of the genuses Tetrahymena and Colpidium have no sterol nutritional requirement, as shown by their growth in the absence of exogenous sterols. Under such conditions, the major unsaponifiable components are tetrahymanol, a pentacyclic triterpenoid alcohol, and diplopterol, an isomer of tetrahymanol. Other minor components found are squalene and ubiquinone (Holz, G. G. and Conner, R. L. (1973) The composition, metabolism and roles of lipids in Tetrahymena. In "Biology of Tetrahymena" (Elliot A M., ed). Dowden, Hutchinson & Ross, Stroudsberg, P., chapter 4, pp. 99–122; Wilton, D. C. (1983), Biochem. J. 216:203–206). When Tetrahymena is grown in the presence of exogenous sterols, however, the biosynthesis of tetrahymanol is completely inhibited and the added sterol is accumulated by the organism and, in most cases, metabolized to other sterols. Different types of biotransformations have been observed, including $\Delta 7$ and $\Delta 22$ desaturation and the removal of ethyl, but not methyl groups, from C24 (Mallory, F. B. and Conner, R. L. (1971), Lipids 6:149–153; Conner, R. L., Landrey, J. R., Joseph, J. M., Nes, W. R., (1978) Lipids 13:692–696; Ferguson, K. A., Davis, F. M., Conner, R. L., Landrey, J. R. and Mallory, F. B. (1975), J. Biol. Chem. 250:6998–7005).

In the case of cholesterol, the biotransformations include conversion to $\Delta 7,22$-didehydrocholesterol, as the main derivative (a close analog of ergosterol, also called provitamin D2), together with $\Delta 22$-dehydrocholesterol and $\Delta 7$-dehydrocholesterol (provitamin D3). The ratios between these desaturated derivatives can be controlled by changing culture conditions (Conner, R. L., Mallory, F. B., Landrey, J. R. and Iyengar, C. W. L. (1969), J. Biol. Chem. 244:2325–2333).

Further, Tetrahymena possesses a lipidic membrane rich in unsaturated fatty acids. The most abundant is gamma-linolenic acid (18:3, n-6). These organisms therefore have the potential to enhance the level of this type of essential fatty acid in the media where they grow. Moreover, they can synthesize these unsaturated fatty acids from saturated fatty acids, such as stearate and palmitate. A double benefit is thereby obtained: lowering the level of unwanted, saturated fatty acids, while increasing the level of desirable, unsaturated fatty acids. Further, *Tetrahymena thermophila* and *T. pyriformis* have been shown to produce and release to the surrounding medium, beta-galactosidase, an enzyme which splits lactose into glucose and galactose (Kiy, T. and Tiedtke, A. (1992), Appl. Microbiol. Biotechnol. 37:576–579). This enzyme may be useful for cleaving lactose in milk.

The present invention utilizes the foregoing properties of Tetrahymena, and other protozoa, to provide methods for treating cholesterol-containing foodstuffs (such as milk, egg yolk and other foodstuffs) to achieve one or more of the following goals: (a) reduce the level of cholesterol in foodstuffs; (b) reduce the level of saturated fatty acids in foodstuffs; (c) increase the level of unsaturated fatty acids in foodstuffs; (d) increase the level of one or more vitamin D precursors in foodstuffs and (e) reduce the level of at least some proteins in foodstuffs.

SUMMARY OF THE INVENTION

Thus, it is one object of the present invention to provide methods for reducing the amount of cholesterol in dairy products, such as milk, and in other cholesterol-containing foodstuffs, preferably without significantly altering the organoleptic properties of the treated foodstuffs.

It is another object of the present invention to provide methods for increasing the amount of $\Delta 7$-dehydrocholesterol (provitamin D3) and $\Delta 7,22$-didehydrocholesterol, which is a close analog of provitamin D2, in foodstuffs.

It is another object of the present invention to provide methods for increasing the amount of polyunsaturated fatty acids (PUFA) in cholesterol-containing foodstuffs (such as milk).

It is yet another aim of the present invention to proteolytically degrade selected proteins in foodstuffs, such as casein in milk and other dairy products.

One or more of the foregoing objectives can be accomplished equally, or each to a different extent, depending on the protozoan strain and cultivation conditions utilized.

In accordance with the foregoing, in one aspect the present invention provides methods for changing the composition of a cholesterol-containing foodstuff, the methods comprising the step of culturing a member of the family Tetrahymenidae in a liquid, cholesterol-containing foodstuff under conditions that enable one or more (or all) of the following changes in the composition of the foodstuff: (a) reduction in the level of cholesterol in the treated foodstuff; (b) reduction in the level of saturated fatty acids in the treated foodstuff; (c) increase in the level of unsaturated fatty acids in the treated foodstuff; (d) increase in the level of at least one vitamin D precursor in the treated foodstuff and (e) reduction in the level of at least one protein in the treated foodstuff. The foodstuff can be a dairy product, such as milk or egg yolk. The milk can be milk from any mammal, such as cow or goat, and egg yolk can be from eggs of any species of bird, such as domestic chicken eggs. Representative examples of other foodstuffs that can be treated by the methods of the present invention are broth and soups that contain materials of animal origin including cholesterol.

Optionally, the methods of the present invention include the additional step of removing substantially all of the cells of the family Tetrahymenidae from the liquid foodstuff after treatment of the liquid foodstuff. Examples of members of the family Tetrahymenidae useful in the practice of the present invention include *Tetrahymena thermophila* (*T. thermophila*), such as *Tetrahymena thermophila* strain CU399, and *T. pyriformis, T. patula, T. rostrata, T. vorax, T. paravorax, T. chironomi, T. setifera, T. corlissi, T. stegomyiae* and *T. limacis*.

When the methods of the present invention are utilized to reduce the level of cholesterol in milk (such as whole milk), the level of cholesterol in the milk after treatment is preferably less than 50%, more preferably less than 20%, most preferably less than 5% of the level of cholesterol in the milk before treatment. Representative culture conditions for lowering the level of cholesterol in milk utilizing a member of the family Tetrahymenidae are: culture temperature of from 18° C. to 38° C., at a pH of between 5.0 and 8.0, for a time period of from one hour to 72 hours. Representative culture conditions for lowering the level of cholesterol in milk utilizing *Tetrahymena thermophila* are: culture temperature of from 24° C. to 37° C., at a pH of between 5 and 8, for a time period of from 1 hour to 72 hours.

In one embodiment of the invention, a member of the family Tetrahymenidae is cultured in a liquid, cholesterol-containing foodstuff under conditions that enable a reduction in the level of cholesterol in the treated foodstuff, and an increase in the level of at least one vitamin D precursor (formed by the biochemical conversion of the cholesterol to the vitamin D precursor(s)) in the treated foodstuff. Representative examples of vitamin D precursors are $\Delta$7-dehydrocholesterol and $\Delta$7,22-didehydrocholesterol. For example, the methods of the present invention can be used to increase the combined levels of $\Delta$7-dehydrocholesterol and $\Delta$7,22-didehydrocholesterol in milk to greater than 10 $\mu$g/ml and 20 $\mu$g/ml after 6 h and 12 h of treatment, respectively; or in other embodiments, to increase the combined levels of $\Delta$7-dehydrocholesterol and $\Delta$7,22-didehydrocholesterol in milk to greater than 20 $\mu$g/ml and 45 $\mu$g/ml after 6 h and 12 h of treatment, respectively.

In another embodiment of the invention, a member of the family Tetrahymenidae is cultured in a liquid, cholesterol-containing foodstuff under conditions that enable a reduction in the level of saturated fatty acids in the treated foodstuff and an increase in the level of polyunsaturated fatty acids in the treated foodstuff. In one embodiment, the content of $\gamma$-linolenic acid (18:3 (n-6)), in treated milk increases between 2 to 6 fold, from about 2 mg/100 g milk in untreated milk to about 12 mg/100 g milk in milk treated with Tetrahymena for 12 hours.

In another embodiment of the invention, a member of the family Tetrahymenidae is cultured in a liquid, cholesterol-containing foodstuff under conditions that enable a reduction in the level of casein in the treated foodstuff. For example, in one embodiment, the methods of the present invention can be used to reduce the level of casein in milk to less than 70%, preferably less than 40%, more preferably less than 10%, of the level of casein in the milk before treatment.

The methods of the present invention provide several advantages. For example, in some embodiments the methods not only selectively decrease foodstuff cholesterol concentration, preferably without significantly altering organoleptic properties, but at the same time, the process of desaturating cholesterol at position 7, converts it into $\Delta$7-dehydrocholesterol, also known as provitamin D3. Thus, a single reaction decreases an unwanted material (cholesterol), converting it into a desirable one (provitamin D3). Moreover, in some embodiments, the methods of the invention enhance the contents of essential unsaturated fatty acids, especially 18:3 (n-6) fatty acids, reported to possess cardiovascular health promoting properties. Also, the proteolytic breakdown of proteins, such as milk casein, which may have undesirable effects, can be achieved utilizing some embodiments of the inventive methods described herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
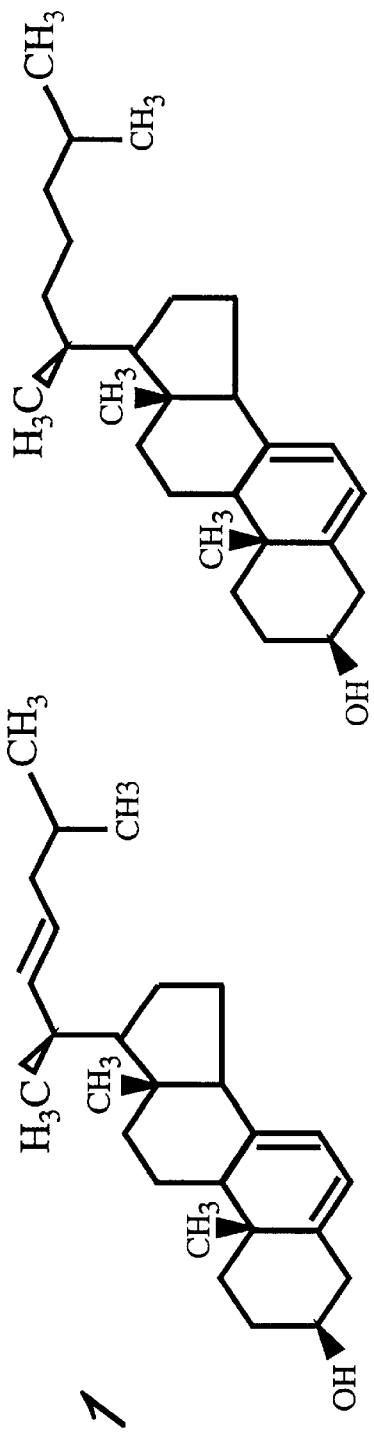
FIG. 1 shows the chemical structures of $\Delta$7,22-didehydrocholesterol, $\Delta$7-dehydrocholesterol (provitamin D3), $\Delta$22-dehydrocholesterol and, for comparison, that of ergoesterol (provitamin D2).
Figure 1:
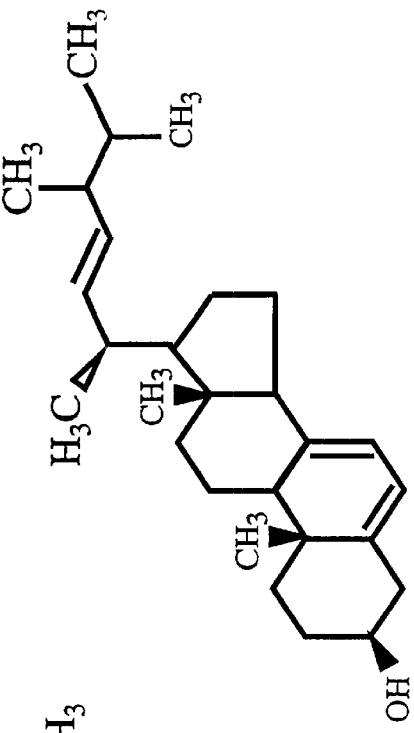
Figure 1:
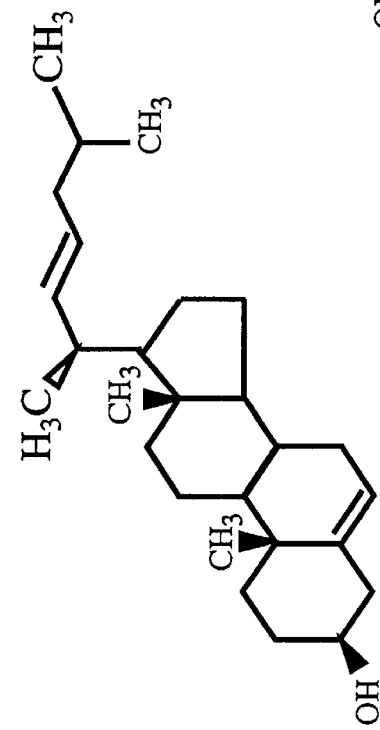
Figure 2A:
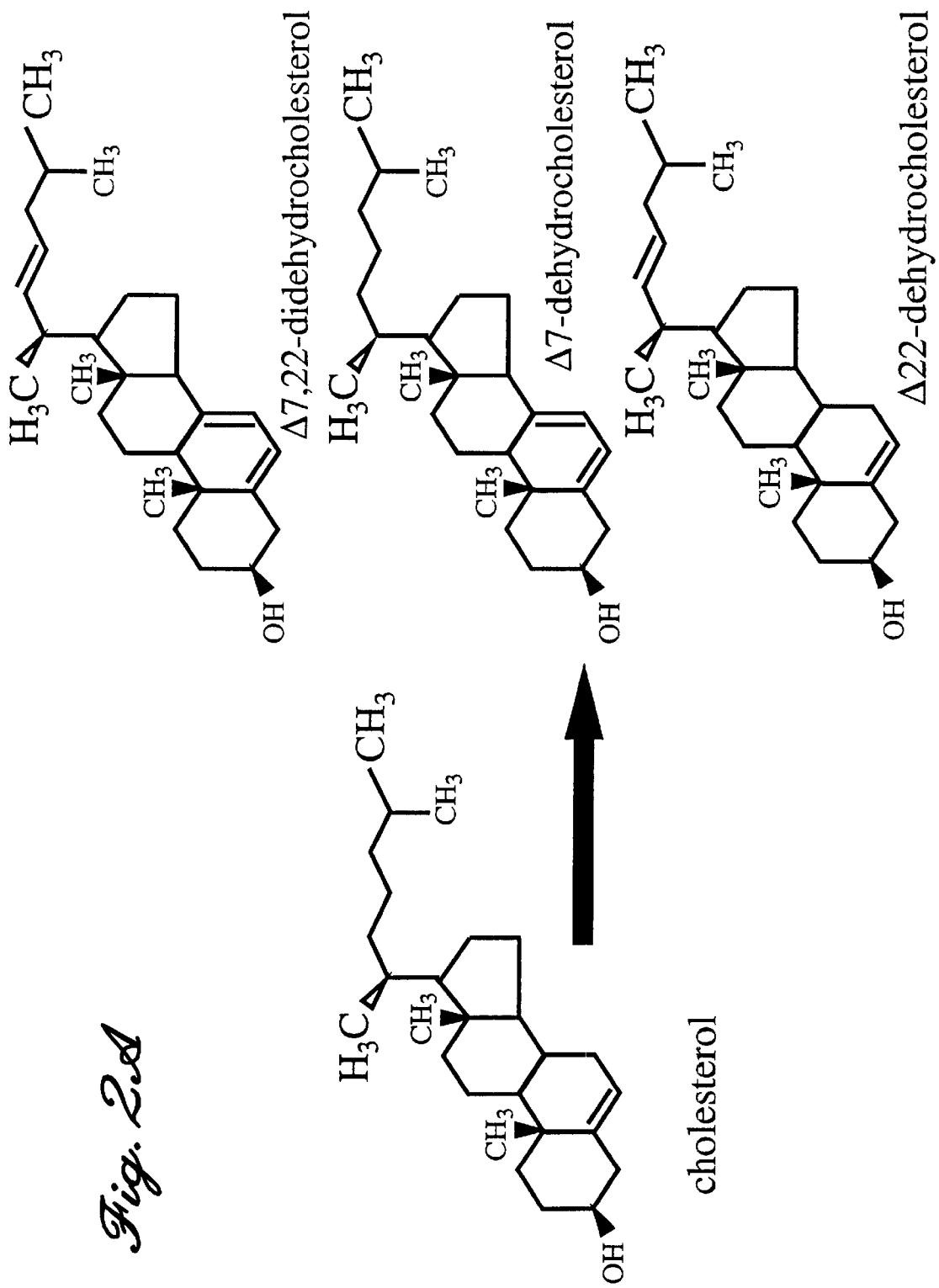
FIG. 2A shows three desaturation products of cholesterol.
Figure 2B:
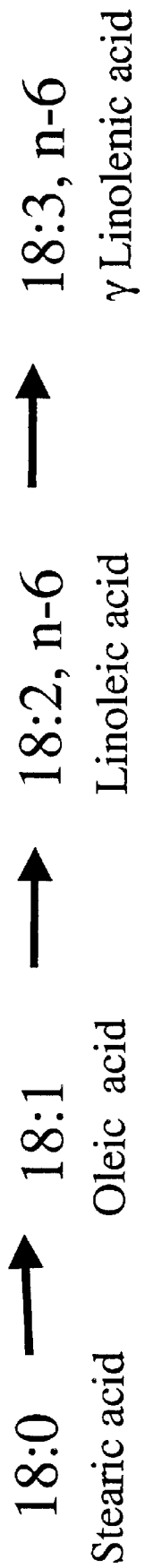
FIG. 2B shows pathways of fatty acid desaturation in Tetrahymena.

As used herein, the term "cholesterol-containing foodstuff" means any natural or synthetic substance that contains cholesterol and that can be consumed by a mammal to provide nutrients.

As used herein, the term "milk product" means milk obtained from the female of any mammalian species, and any edible product or component derived from milk. Representative examples of milk products include whole milk, milk supplemented with one or more nutrients (such as vitamins and minerals), yogurt, and cream.

The present invention provides methods for changing the composition of a cholesterol-containing foodstuff, the methods comprising the step of culturing a member of the family Tetrahymenidae (such as any species of Tetrahymena or Colpidium) in a liquid, cholesterol-containing foodstuff under conditions that enable one or more (or all) of the following changes in the composition of the foodstuff: (a) reduction in the level of cholesterol in the treated foodstuff; (b) reduction in the level of saturated fatty acids in the treated foodstuff, (c) increase in the level of unsaturated fatty acids in the treated foodstuff; (d) increase in the level of at least one vitamin D precursor in the treated foodstuff and (e) reduction in the level of at least one protein in the treated foodstuff. Preferably the organoleptic properties of the treated foodstuffs are the same, or substantially the same, as those of the untreated foodstuffs.

Any species of Tetrahymena or Colpidium can be utilized in the practice of the invention and can be obtained from public depositories, such as the American Type Culture Collection (ATCC), 10801 University Boulevard, Manassas, Va. 20110-2209, U.S.A. By way of example, *Tetrahymena thermophila* wild type strain CU399 is useful in the practice of the invention.

Preparation of a protozoan inoculum culture: Any suitable culture medium can be used to prepare an inoculum of protozoa to inoculate foodstuffs to be treated in accordance with the present invention. For example, media based on yeast extract, glucose and skimmed milk can yield high cell densities at very low costs (Kiy, T. and Tiedtke, A. (1992), Appl. Microbiol. Biotechnol. 37:576–579, which publication is incorporated herein by reference). For example, a modification of the medium described by Kiy and Tiedtke (1992) can be used. This medium includes yeast extract (0.1 to 10% w/v, preferably 0.5% w/v), glucose (0.1 to 5% w/v, preferably 1% w/v), iron citrate (0.0001 to 0.1% w/v, preferably 0.003% w/v), supplemented with between 1 and 50% v/v fluid skimmed milk (preferably between 5 and 20% v/v). Another useful medium for culturing an inoculum of protozoa has the same composition as the foregoing, modified, Kiy and Tiedtke medium, except that the fluid milk was replaced with between 0.1 and 5% (preferably 1%) w/v tryptic casein hydrolysate.

Cultivation of the protozoa useful in the practice of the invention can be achieved by any suitable means. For example, fermentors that utilize mechanical stirring, or air lift fermentors can be utilized for large-scale cultivation of the protozoa useful in the practice of the invention.

The optimal culture temperature depends on the strain of protozoa, but typically falls within the range of from 20° C. to 38° C. Similarly, the optimal culture pH depends on the strain of protozoa, but typically falls within the range of from pH 5.0 to pH 8.0. For example, a pH of 6.8 has been successfully used to cultivate *Tetrahymena thermophila* wild type strain CU399. Culture times also depends on the protozoan strain and the chosen method of cultivation. Typically, culture times of between 10 and 80 hours (such as 23–25 hours) are adequate.

Cultivation of the protozoa inoculum can be carried out with or without agitation. When agitation is used, exemplary rates of stirring are in the range of from 50 rpm to 600 rpm, typically about 100 rpm. Finally, to achieve high protozoan densities in a relatively short time, cultivation can be carried out in airlift bioreactors (Hellenbroich, D., et al., Appl. Microbiol. Biotechnol. 51:447–455 (1999)) utilizing any suitable medium, such as the media disclosed in Tiedtke and Kiy German Patent DE 4238842); Kiy and Tiedtke, 1992, supra, each of which publications are incorporated herein by reference. Typically, cell densities of up to $2 \times 10^7$ cells/ml can be achieved.

Transfer of protozoa to foodstuffs: protozoa can be directly transferred from the inoculum to the foodstuff to be treated, or the cells can be harvested prior to transfer. Centrifugation or sedimentation (preferably done in the cold) can be used to harvest the protozoa. If sedimentation is used, the protozoan culture is preferably diluted with water or a dilute sugar solution prior to sedimentation.

Preferably the harvested cells are washed and adapted to the foodstuff which they will be used to treat. For example, consistent recovery of viable *Tetrahymena thermophila* wild type strain CU399 cells was obtained by resuspending cells grown in either of the above-referenced Kiy and Tiedtke media in glucose (0.5% to 10% (w/v), preferably 3% w/v), or some other simple sugar, such as sucrose or galactose. This provides a hypertonic medium, well tolerated by the cells and prepares them for resuspension in foodstuffs. In another, exemplary transfer protocol, protozoan cells are resuspended in a 5% to 80% milk solution in water (preferably a 50% milk solution in water).

Treatment of Foodstuffs: If necessary, foodstuffs can be diluted to allow the optimal growth of the protozoa and in conditions that do not hamper the biochemical reaction(s) of interest. Thus, as an example, milk can be diluted with water or other diluent to a concentration of 20% to 60%. The growth rate of the protozoa is typically higher in the diluted milk than in undiluted milk, and the biochemical reaction(s) of interest typically occurs more quickly.

Cultivation of the protozoa in foodstuffs is typically conducted at a temperature in the range of from 20° C. to 35° C. The pH of the foodstuff is typically adjusted to fall within the range of from pH 5.0 to pH 8.0. The desired culture time mainly depends on the strain of protozoa utilized, and the identity and extent of dilution (if any) of the foodstuff being treated. Typically, culture times are from 4 hours to 80 hours (such as from 11 hours to 14 hours).

Cultivation of protozoa in the foodstuff being treated can be carried out with or without agitation. If the culture is stirred, typically a stirring speed of between 50 rpm and 600 rpm (such as about 100 rpm) is utilized. Any suitable cultivation method can be utilized, such as the use of tank fermentors or air lift fermentors.

In some embodiments of the present invention, the protozoa are removed from the treated foodstuff after treatment. Any suitable method can be employed to remove the microorganisms from the foodstuff after treatment. For example, continuous centrifugation or microfiltration can be used, depending on the characteristics of the treated foodstuff (e.g., microfiltration is not suitable for use with a very viscous foodstuff). A presently preferred method of removing the protozoa from the treated foodstuff is sedimentation in the cold. This method is simple and relatively cheap to perform. If desired, dilution of the foodstuff with water or dilute sugar solutions can be used to facilitate sedimentation. If the protozoa are removed from the treated foodstuff after treatment, the foodstuff is not fortified with provitamin D. Nonetheless, the decrease in cholesterol in the treated foodstuff can be close to 100% compared to the level in the untreated foodstuff.

The methods of the present invention can be used to convert between 50 and 100% of the cholesterol initially present in the foodstuffs to cholesterol derivatives, such as Δ7-dehydrocholesterol (provitamin D3) and Δ7,22-didehydrocholesterol, a close analog of ergosterol (provitamin D2). Typically, about 80% of the cholesterol originally present in the foodstuff is recovered as provitamins D after treatment of the foodstuff in accordance with the present invention. While vitamin D, a supplement normally added to milk, can have toxic effects, the provitamins have a much lower risk of toxicity. This is due to the fact that the provitamins lack vitamin D activity and they have to undergo chemical conversion by exposure to UV light to become active vitamins.

Preferred embodiments of the methods of the present invention yields treated, whole milk that has a fatty acid composition that is very similar to the fatty acid composition of untreated, whole milk, except that treated, whole milk contains significantly higher amounts of γ-linolenic acid (18:3 (n-6)), and a small increase in the free fatty acid fraction. The accumulation of γ-linolenic acid is of particular interest in milk which is normally low in this essential fatty acid.

If desired, foodstuffs treated in accordance with the present invention can be dehydrated and used as a powder.

The following examples merely illustrate the various embodiments now contemplated for practicing the invention, but should not be construed to limit the invention.

EXAMPLE 1

Treatment of Milk with *Tetrahymena thermophila* Wild Type Strain CU399 Cells Adapted to Milk Osmolarity Cells and cultures. *Tetrahymena thermophila* wild type strain CU399 cells were cultured in a modification of the medium described by Kiy and Tiedtke (1992), supra. The modified medium included 0.5% w/v yeast extract, 1% w/v glucose, 0.003% w/v iron citrate, supplemented with 5% v/v fluid skimmed milk.

The cells were grown to a density of $10^6$ cells/ml, pelleted by centrifugation, washed once in 3% glucose and resuspended in this solution in 1/10 of the initial volume. Four to nine volumes of milk were then added so that the inoculum constituted 10% to 20% of the total volume. The choice of 3% glucose was based on the fact that this glucose concentration represents an osmolarity close to that of lactose in milk (approximately 5%). The cells were therefore preadapted to the osmolarity of milk by resuspension in the 3% glucose solution. Cultivation was carried out with rotary shaking (100rpm) at 30° C. The culture pH was not controlled.

Analysis of sterols. Total lipids were saponified and the unsaponifiable material was analyzed by three different methods used for separation of sterols. Routinely, HPLC separation on a C-18 column was used with methanol/water (0.95: 0.05 v/v) as mobile phase. The absorbency of the eluates was monitored at 205 and 285 nm. An increase in the latter is indicative of cholesterol desaturation at position 7 with formation of conjugated diene. To aid quantitation, stigmasterol (100 µg/mL) was added to the milk prior to saponification, as an internal standard. Another method for sterol separation is gas chromatography on a 30 m. HP-1 capillary columns at 260° C., using helium as carrier. Additionally, argentation TLC chromatography was also utilized Silica gel G plates are impregnated with 10% (w/v) methanolic silver nitrate, dried and the chromatograms developed using n-hexanol/ethyl acetate (9:1, v/v) as solvent mixture.

Fatty acid analysis. After saponifying the lipids and extracting the unsaponifiable fraction which includes the sterols, the remaining lower phase was washed once with 4 volumes of hexane. Fatty acids were then extracted with 2 volumes of hexane after acidification of the lower phase with 1 volume of 4N sulfuric acid. The hexane phase, containing fatty acids, was dried under nitrogen and fatty acid methyl esters (FAME) prepared by addition of 2.5% v/v sulfuric acid in anhydrous methanol and incubation under nitrogen at 64° C. for 2 hours. The FAME were extracted with hexane after addition of 1 volume of water and analyzed by capillary gas chromatography using an Omegawax 250 column of 30 m and nitrogenous carrier. A 3° C./min temperature gradient from 175 to 230° C. was used for FAME separation. As internal standard a 21:0 fatty acid was added to the milk preparations before saponification.

Extraction and analysis of complex lipids. Milk samples were extracted by a modification of the method of Bligh, E. G. and Dyer, W. J. (Can. J. Biochem. Physiol. 37:91–1917 (1959)), successively adding 1 volume of methanol and then 1 volume of chloroform to 0.9 volumes of milk. For neutral lipid separation, TLC on silica gel G plates was used. The solvent mixture was hexane/diethylether/acetic acid 70:30:1 (v/v). Polar lipids were separated using the same type of plates and chloroform/methanol/water 65:35:2.5 (v/v) as the developing solvent mixture. The lipids were visualized by charring at 150° C. after spraying with 10% (w/v) cupric sulfate in 8% (v/v) orthophosphoric acid. The resulting plates were scanned and analyzed by densitometry using Sigmagel computer software.

Protein electrophoresis. Samples were dissolved in Laemmli sample buffer and analyzed using a Phast gel system (Amershamn Pharmnacia Biotech, Inc., Piscataway, N.J.).

Aminoacid analysis. Milk samples were extracted once with 2 volumes (vol) of hexane to remove most of the lipids, and the proteins in the lower phase was subjected to acid hydrolysis and their amino acid composition analyzed.

Figure 3A:
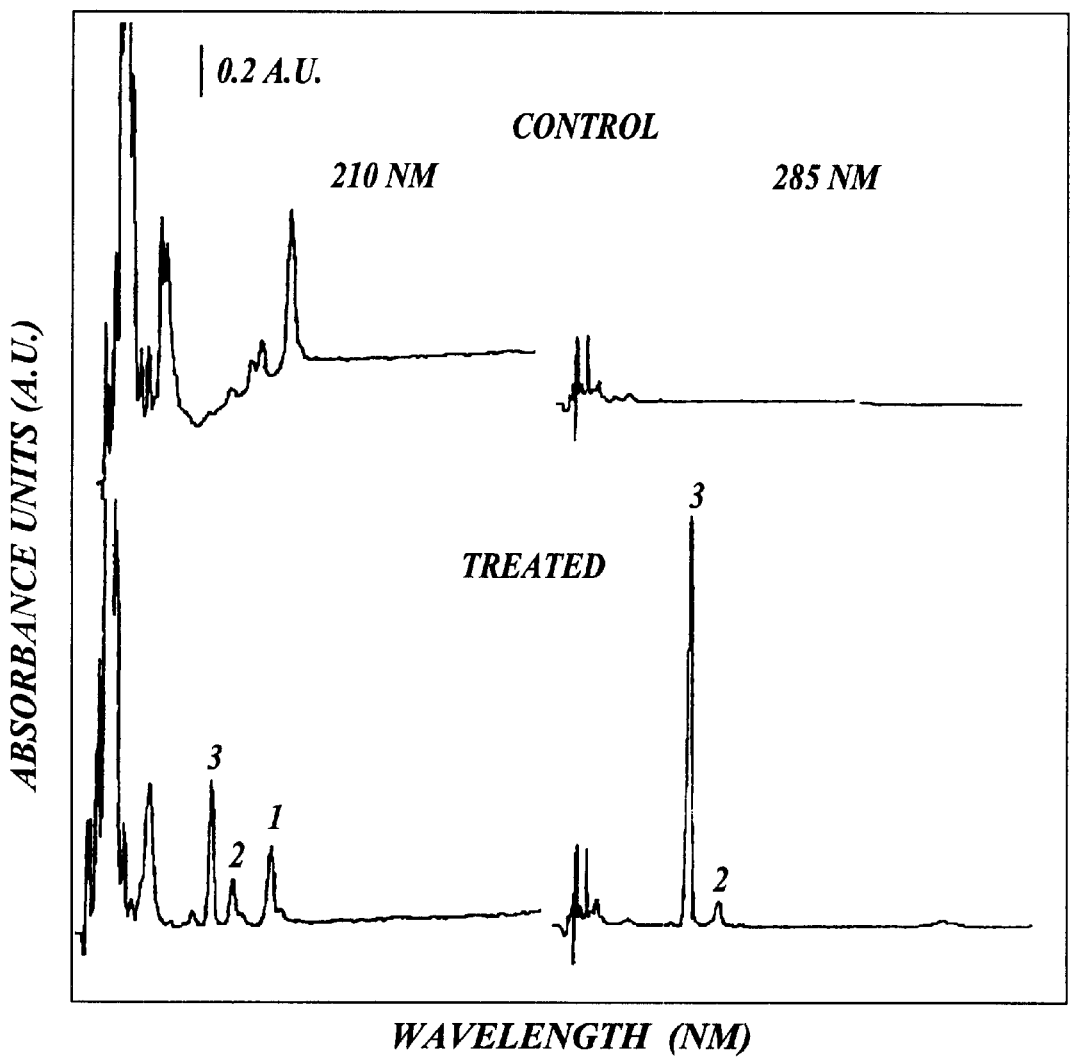
FIG. 3A shows high performance liquid chromatograms showing the separation of cholesterol (peak 1) from its desaturated derivatives, $\Delta$7-dehydrocholesterol (peak 2) and $\Delta$7,22-didehydrocholesterol (peak 3) before (control) after (treated) incubation in the presence of Tetrahymena cells. The lipids in the milk samples were saponified and the unsaponifiable fraction extracted with ether and subjected to high performance liquid chromatography (HPLC). The upper, HPLC chromatogram is control milk, and the lower, HPLC chromatogram is milk treated with Tetrahymena cell suspensions as described in Example 1.
Figure 3B:
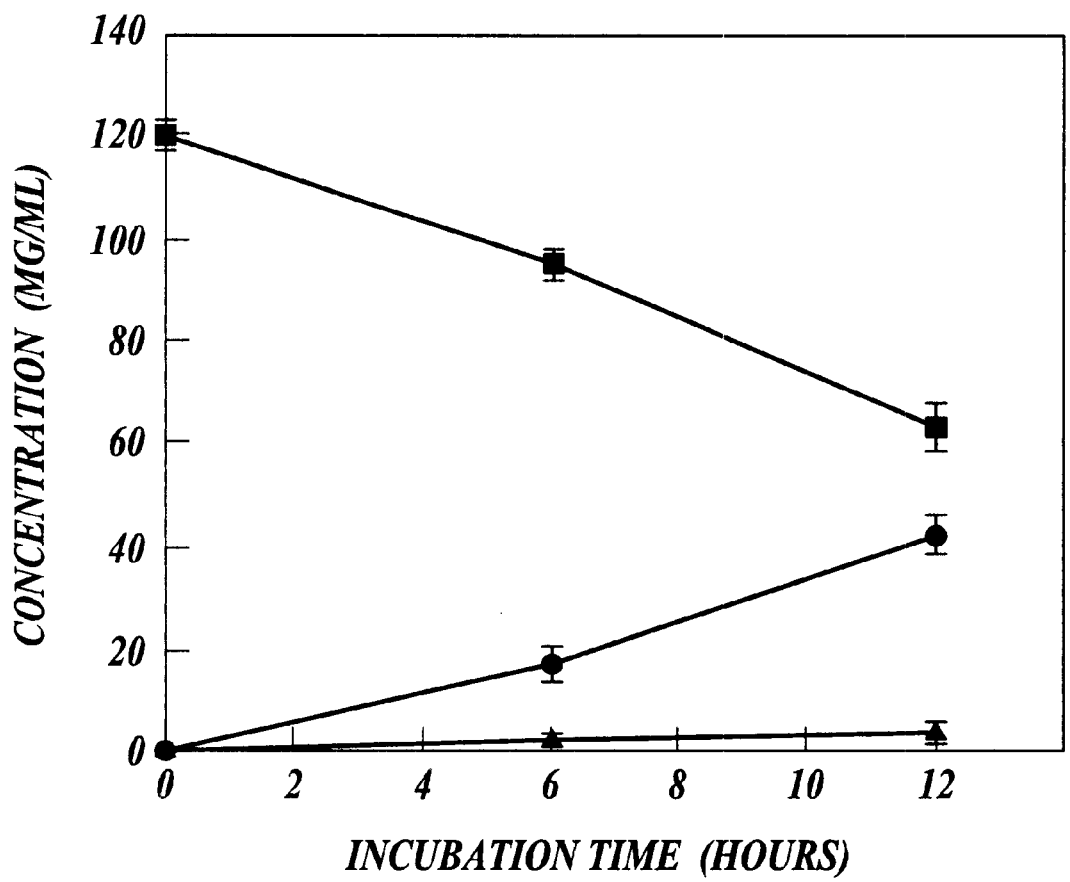
FIG. 3B shows changes in the concentration of cholesterol (■) and its derivatives, $\Delta$7-dehydrocholesterol (●) and $\Delta$7,22-didehydrocholesterol (▲) in milk after different incubation periods in the presence of Tetrahymena. The samples were quantitated after HPLC separation. Extensive conversion of cholesterol to the dehydro derivatives is observed after 12 h incubation in the presence of Tetrahymena.

Analysis of Whole Milk Treated with *Tetrahymena thermophila* wild type strain CU399. Short term incubation of these milk suspensions resulted in considerable conversion of the cholesterol initially present in milk to Δ7-dehydrocholesterol (provitamin D3) and Δ7,22-didehydrocholesterol, a close analog of ergosterol (provitamin D2). FIG. 3A shows high performance liquid chromatograms in which the decrease in the level of cholesterol, as well as the increase in the levels of its dehydro-derivatives, in treated milk is observed. In FIG. 3B, the kinetics of these processes are shown. Roughly half of the cholesterol is metabolized by the cells in a 12-hour period and more than 80% of it is recovered in the form of provitamins (Δ7-dehydrocholesterol and Δ7,22-didehydrocholesterol). These results were confirmed using an additional method for sterol separation, i.e. gas chromatography, which also resolved the sterol mixtures into cholesterol, its dehydro-derivatives and stigmasterol used as internal standard. Thus, these data show that Tetrahymena can be used to reduce cholesterol concentration in whole milk, while at the same time increase the provision of provitamin D.

Although vitamin D is a supplement normally added to milk, increasing the level of provitamin D compounds in accordance with the present invention may eliminate the need for this addition, thus reducing the cost of milk. Moreover, while vitamin D3 can produce hypervitaminosis D at even low levels (Fox, P. F. and McSweeney, P. L. H. (1998) Vitamins in milk and dairy products. In "Dairy Chemistry and Biochemistry", chapter 6, Blackie Academic & Professional, London), the provitamins have a much reduced risk of doing so. This is due to the fact that they lack vitamin D activity and they have to undergo chemical conversion by exposure to UV light to become active vitamins. A higher transformation of the cholesterol present in untreated foodstuffs can be achieved using an inoculum of higher density or longer incubation times.

Further confirmation of the ability of Tetrahymena to desaturate cholesterol was obtained in experiments where radiolabeled cholesterol conversion was investigated using argentation TLC separation of the sterols. Analysis of neutral lipids showed that a large fraction of the radiolabeled cholesterol added to milk incubated with Tetrahymena in accordance with the present invention is present in the form of acylesters. This observation agrees with previous observations by Conner and coworkers (J. Biol. Chem. 244:2325–2333 (1969) and suggests that significant amounts of the sterols are sequestered inside the cells. Thus, cell removal after treatment of milk, or other foodstuffs, in accordance with the present invention will result in even greater reduction of total cholesterol from treated milk.

The fatty acid composition of the treated milk was examined by gas chromatography. The fatty acid profiles of untreated milk (control) and milk cultured in the presence of Tetrahymena for 12 hours (h) were very similar, except that treated milk displayed a four-fold increase in γ-linolenic acid (18:3, n-6) with respect to control milk. A small increase in the free fatty acid fraction of the treated milk was found after TLC separation of total neutral lipids. This increase is probably due to the action of released lipolytic enzymes that include phospholipases and triacylglycerol lipase (see, Florin-Christensen, J., et al., J. Protozool. 32:657–660 (1985); Florin-Christensen, J., et al., Comp. Biochem. Physiol. 85B:143–148 (1986); Florin-Christensen, J., et al., Comp. Biochem. Physiol. 85B:149–155 (1986)). The presence of phospholipases may aid in the cholesterol removal from milk and egg products (Ohuchi Kozo and Saito Chiaki, European Patent EP0493045). It is also evident that the overall lipid composition remains basically the same in control and treated milk.

In contrast to the lipids, the Tetrahymena strain used in this study caused considerable degradation of protein. Over 30% of the α and β-casein was broken down after 6 h and over 60% disappeared after 12 h of incubation in the presence of *Tetrahymena thermophila* wild type strain CU399.

The total amino acid composition of the milk was increased. Therefore, the availability of amino acids from milk was enhanced between 20 to 60%.

Tetrahymena strains that secrete higher or lower amounts of specific hydrolases have been generated by mutagenesis and strains which carry the mutations stably in their micronuclei have been identified. This approach could be used to obtain Tetrahymena strains with low protease activity if casein presence is required.

EXAMPLE 2

Treatment of Milk with *Tetrahymena Thermophila* Wild Type Strain CU399 Which has not been Previously Adapted to Growth in Milk The procedure for Tetrahymena cell culture was identical to that set forth in Example 1, except that the Tetrahymena cells were harvested and added directly to the milk without previously adapting the cells to growth in milk.

Utilizing this process, there was a decrease in the viability of the ciliates, but the resulting changes in the treated milk were qualitatively and quantitatively similar to the changes reported in Example 1.

EXAMPLE 3

Conversion of Cholesterol at Low Cell Density

Milk was treated as described in Example 1, except that the cells were not concentrated prior to inoculation. In this way, the culture was started at a relatively low cell density. In this experiment, a decrease of cholesterol between 20% and 40% was observed after 24 hours of culture and between 50% and 70% after 48 hours. The removal of the cells from the milk by sedimentation in the cold, followed by collection of the substantially cell-free supernatant, resulted in a considerable decrease in the amounts of all sterols in the supernatants including cholesterol and its Δ-7 derivatives. Between 80 and 95% of all sterols were removed from the culture by cell sedimentation. The process can be accelerated by brief centrifugation, 1000 xg, 1 min, of chilled cell suspensions, with similar results regarding removal of sterols. Filtration through paper filters such as Whatman No. 1 of chilled suspensions, or filtration after heating the suspensions at 60° C. for 30 min, are alternative cell removal methods. The sterol contents in the filtrates were, however, higher than the supernatants of the cold-sedimented cell suspensions described above. Total sterols, including cholesterol and its derivatives, were reduced in the range of 50 to 80%, after the filtration procedures.

The fatty acid profile was similar to that of treated milk disclosed in Example 1. This experiment demonstrates that the rate at which cholesterol is converted to its dehydro derivatives is slower when a low density inoculum of Tetrahymena is used.

EXAMPLE 4

Conversion of Cholesterol in Milk Diluted by Fifty Percent

The same procedures for Tetrahymena cell growth and transfer to milk were used as were used in Example 1 except that the milk was diluted to 50% with water prior to inoculation with Tetrahymena. The results showed that within the first 6 hours of culture 50% of the cholesterol in the milk was converted to its dehydro derivatives. However, these values can be increased using a higher inoculum. Eighty percent of the cholesterol can be removed if the Tetrahymena are eliminated from the culture medium.

EXAMPLE 5

Treatment of Egg Yolk with Tetrahymena

*Tetrahymena thermophila* cells were grown in a growth medium based on protease peptone/yeast extract for 30 hours with continuous rotary shaking (150 rpm) at 30° C. The medium consisted of 0.5% w/v yeast extract, 1% w/v glucose, 0.003% w/v iron citrate, supplemented with 1% tryptone. The cell suspensions were chilled briefly (about 20 s) on ice and then centrifuged for 20 s at 2000 rpm. The supernatant was discarded and cells were resuspended in half of the initial volume in an egg yolk preparation which included 10% (v/v) egg yolk 100 μg/ml ampicillin, 100 μg/ml streptomycin, 0.003% iron citrate, either with or without the addition of 0.1% (w/v) yeast extract. Incubation was carried out at 30° C. for up to 44 hours, with shaking (150 rpm).

A reduction of more than 40% in cholesterol content was obtained in the medium without yeast extract at 44 h. With yeast extract, over 50% conversion of cholesterol was observed. The final distribution of cholesterol, Δ7-dehydrocholesterol and Δ7,22-didehydrocholesterol in the medium without yeast extract, as analyzed by HPLC as described in Example 1, was 55.7%, 7.8% and 36.4%, respectively. If the medium included yeast extract, the corresponding final values were 45.5%, 6.9% and 47.6%, respectively.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for changing the composition of a cholesterol-containing foodstuff, said method comprising the steps of:
   (1) culturing *Tetrahymena thermophila* in a liquid cholesterol-containing foodstuff under conditions that produce a change in the composition of the foodstuff selected from the group of composition changes consisting of:
      (a) reduction in the level of cholesterol in the foodstuff after culture compared to the level of cholesterol in the foodstuff before culture;
      (b) reduction in the level of saturated fatty acids in the foodstuff after culture compared to the level of saturated fatty acids in the foodstuff before culture;
      (c) increase in the level of unsaturated fatty acids in the foodstuff after culture compared to the level of unsaturated fatty acids in the foodstuff before culture;
      (d) increase in the level of at least one vitamin D precursor in the foodstuff after culture compared to the level of the at least one vitamin D precursor in the foodstuff before culture;
      (e) reduction in the level of at least one protein in the foodstuff after culture compared to the level of the at least one protein in the foodstuff before culture; and
   (2) providing the foodstuff as a food after culture.

2. The method of claim 1 wherein the liquid cholesterol-containing foodstuff is a milk product.

3. The method of claim 1 wherein the liquid cholesterol-containing foodstuff consists essentially of whole milk.

4. The method of claim 1 wherein the liquid cholesterol-containing foodstuff consists essentially of egg yolk.

5. The method of claim 1 wherein the *Tetrahymena thermophila* is strain CU399.

6. The method of claim 1 wherein the change in the composition of the foodstuff is a reduction in the level of cholesterol in the foodstuff after culture compared to the level of cholesterol in the foodstuff before culture.

7. The method of claim 6 wherein the foodstuff consists essentially of whole milk.

8. The method of claim 7 wherein the level of cholesterol in the milk after culture is less than 50% of the level of cholesterol in the milk before culture.

9. The method of claim 7 wherein the level of cholesterol in the milk after culture is less than 20% of the level of cholesterol in the milk before culture.

10. The method of claim 7 wherein the level of cholesterol in the milk after culture is less than 5% of the level of cholesterol in the milk before culture.

11. The method of claim 7 wherein *Tetrahymena thermophila* is cultured in the foodstuff consisting essentially of whole milk at a temperature of from 24° C. to 37° C., at a pH of between 5 and 8, for a time period of from 1 hour to 72 hours.

12. The method of claim 1 further comprising the step of removing substantially all of the *Tetrahymena thermophila* from the liquid foodstuff after treatment of the liquid foodstuff in accordance with the method of claim 1.

13. The method of claim 1 wherein there is an increase in the level of at least one vitamin D precursor in the foodstuff after culture compared to the level of the at least one vitamin D precursor in the foodstuff before culture.

14. The method of claim 13 wherein the vitamin D precursor is selected from the group consisting of $\Delta 7$-dehydrocholesterol and $\Delta 7,22$-didehydrocholesterol.

15. The method of claim 14 wherein the combined levels of $\Delta 7$-dehydrocholesterol and $\Delta 7,22$-didehydrocholesterol in the foodstuff is greater than 10 $\mu g/ml$ after 6 hours of culture.

16. The method of claim 15 wherein *Tetrahymena thermophila* is cultured in the foodstuff at a temperature of from 24° C. to 37° C., at a pH of between 5 and 8, for a time period of from 1 hour to 72 hours.

17. The method of claim 1 wherein the change in the composition of the foodstuff is a two- to six-fold increase in the level of polyunsaturated fatty acids in the foodstuff after culture compared to the level of polyunsaturated fatty acids in the foodstuff before culture.

18. The method of claim 17 wherein the foodstuff consists essentially of milk and *Tetrahymena thermophila* is cultured therein at a temperature of from 24° C. to 37° C., at a pH of between 5 and 8, for a time period of from 1 hour to 72 hours.

19. The method of claim 1 wherein the change in the composition of the foodstuff is a reduction in the level of at least one protein in the foodstuff after culture compared to the level of casein in the foodstuff before culture, said protein being casein.

20. The method of claim 19 wherein the foodstuff consists essentially of milk.

21. The method of claim 20 wherein the level of casein in the milk after culture is less than 70% of the level of casein in the milk before culture.

22. The method of claim 20 wherein the level of casein in the milk after culture is less than 40% of the level of casein in the milk before culture.

23. The method of claim 20 wherein the level of casein in the milk after culture is less than 10% of the level of casein in the milk before culture.

24. The method of claim 20 wherein *Tetrahymena thermophila* is cultured in the foodstuff consisting essentially of milk at a temperature of from 24° C. to 37° C., at a pH of between 5 and 8, for a time period of from 1 hour to 72 hours.

25. A method for changing the composition of a liquid cholesterol-containing foodstuff, said method comprising the steps of:
 (1) culturing *Tetrahymena thermophila* in a liquid cholesterol-containing foodstuff under conditions that produce each of the following changes in the composition of the foodstuff:
  (a) reduction in the level of cholesterol in the foodstuff after culture compared to the level of cholesterol in the foodstuff before culture;
  (b) reduction in the level of saturated fatty acids in the foodstuff after culture compared to the level of saturated fatty acids in the foodstuff before culture;
  (c) increase in the level of unsaturated fatty acids in the foodstuff after culture compared to the level of unsaturated fatty acids in the foodstuff before culture;
  (d) increase in the level of at least one vitamin D precursor in the foodstuff after culture compared to the level of the at least one vitamin D precursor in the foodstuff before culture;
  (e) reduction in the level of at least one protein in the foodstuff after culture compared to the level of the at least one protein in the foodstuff before culture; and
 (2) providing the foodstuff as a food after culture.

26. The method of claim 25 wherein the foodstuff consists essentially of a foodstuff selected from the group consisting of milk and egg yolk.

27. The method of claim 26 wherein the foodstuff consists essentially of milk.

28. The method of claim 27 wherein *Tetrahymena thermophila* is cultured in the foodstuff consisting essentially of milk at a temperature of from 24° C., to 37° C., at a pH of between 5 and 8, for a time period of from 1 hour to 72 hours.

29. The method of claim 14 wherein the foodstuff is milk and the combined levels of $\Delta 7$-dehydrocholesterol end $\Delta 7,22$-didehydrocholesterol in the milk is greater than 20 $\mu g/ml$ after 12 hours of culture.

30. The method of claim 17 wherein the level of $\gamma$-linolenic acid increases two- to six-fold in the foodstuff after culture compared to the level of $\gamma$-linolenic acid in the foodstuff before culture.

31. The method of claim 25 wherein the foodstuff is milk, the level of cholesterol in the milk after culture is less than 20% of the level of cholesterol in the milk before culture, the combined levels of the vitamin D precursors $\Delta 7$-dehydrocholesterol and $\Delta 7,22$-didehydrocholesterol in the milk is greater than 20 $\mu g/ml$ after 12 hours of culture, and the level of casein in the milk after culture is less than 10% of the level of casein in the milk before culture.

32. A method for reducing the amount of cholesterol in whole milk, the method comprising the step of culturing a member of the family Tetrahymenidae in whole milk under conditions that reduce the amount of cholesterol in the milk, wherein the amount of cholesterol in the milk after culture is less than 50% of the amount of cholesterol in the milk before culture.

33. A method for increasing the amount of at least one vitamin D precursor in whole milk, the method comprising the step of culturing a member of the family Tetrahymenidae in whole milk under conditions that increase the amount of a vitamin D precursor selected from the group consisting of $\Delta 7$-dehydrocholesterol and $\Delta 7,22$-didehydrocholesterol in the milk.

* * * * *